Jan. 15, 1946.   C. L. EKSERGIAN   2,393,031
CONTROL FOR VEHICLE BRAKES
Original Filed Oct. 18, 1941   3 Sheets-Sheet 2

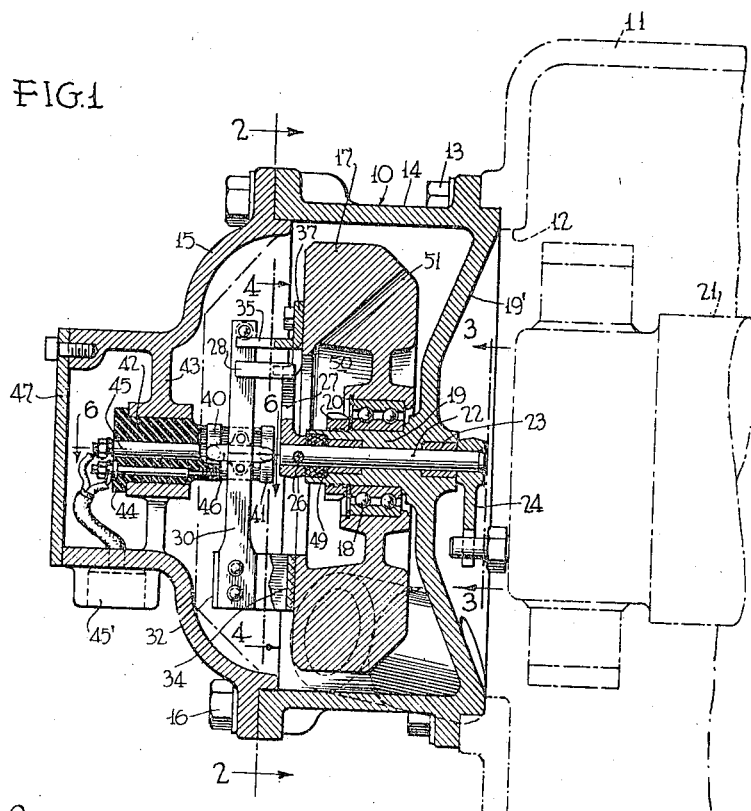

*INVENTOR*
Carolus L. Eksergian
BY John P. Tarbox
*ATTORNEY*

Patented Jan. 15, 1946

2,393,031

UNITED STATES PATENT OFFICE 2,393,031

CONTROL FOR VEHICLE BRAKES

Carolus L. Eksergian, Detroit, Mich., assignor to Budd Wheel Company, Philadelphia, Pa., a corporation of Pennsylvania Original application October 18, 1941, Serial No. 415,518. Divided and this application June 16, 1942, Serial No. 447,222

4 Claims. (Cl. 188—181)

The invention relates to a wheel protector for railway wheels and particularly to such a device adapted to prevent sliding of the wheels on the tracks due to brake application.

This application is a division of copending application Serial No. 415,518, filed October 18, 1941, now Patent No. 2,365,180, issued December 19, 1944.

In modern high speed trains, adequate braking becomes highly important to enable the train to be brought to a stop within reasonable distances. It is of no avail, however, to exert powerful braking on the wheels unless the wheels are maintained during the braking in rolling contact with the rails. If the braking force overcomes the rail adhesion the wheel will slip on the rail and if the braking force is not reduced it will rapidly decelerate to a "locked" state in which it slides on the rail. Such sliding on the rail is objectionable for two reasons: first, it wears "flats" on the slid wheel necessitating the removal of the wheel and the grinding and truing thereof, and second, the sliding wheel has less retarding effect on the train than a braked rolling wheel, since it is well known that the coefficient of sliding friction is less than the coefficient of rolling friction.

It is an object of the invention to overcome these difficulties and insure that the braking force never, during running, is allowed to remain on long enough to permit a slipping wheel to reach the sliding stage, but to maintain the braking at a high efficiency by promptly again applying the braking force to the wheel as soon as may be after the wheel has returned to normal speed following slipping thereof.

It is further an object of my invention to provide an instrumentality of this class which is simple in construction, efficient in operation, assured of a long life in use, and one which can be readily applied to the vehicle and manufactured at low cost.

In practice, the device may consist of a suitable valve mechanism inserted in the usual operator-controlled pressure line to the brake cylinder and an automatic control for the operation of said valve to cut off and release pressure to and from the brake cylinder, said control including an inertia governor responsive to excessive acceleration and deceleration, such as takes place on wheel slip, of the wheel being braked. Preferably, one such control device is inserted in each brake cylinder pressure line so that each wheel or at least each axle of the vehicle is protected by a separate device against sliding. With the usual axle having two wheels fixed thereto, it is desirable to associate a control device with each axle.

Other and further objects and advantages and the manner in which they are attained will become apparent from the following detailed description when read in connection with the drawings forming a part of this specification.

In the drawings:

Fig. 1 is a vertical axial sectional view through a preferred form of inertia governor device shown applied to the end of a vehicle axle.

Fig. 2 is a section at right angles to the section of Fig. 1 taken on the line 2—2 of Fig. 1.

Fig. 3 is a fragmentary sectional view taken on the line 3—3 of Fig. 1.

Figure 4:
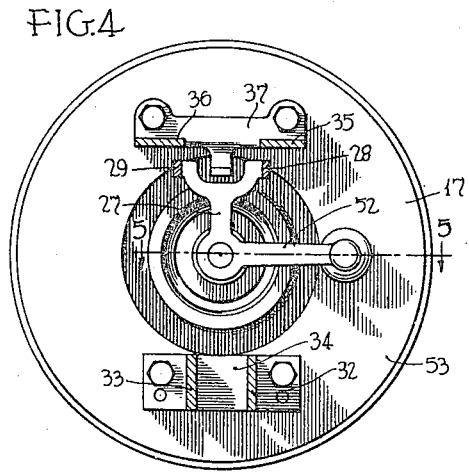
Fig. 4 is a sectional view, the section being taken on the line 4—4 of Fig. 1.
Figure 5:
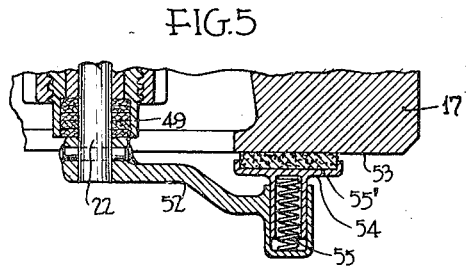
Fig. 5 is a fragmentary sectional view on an enlarged scale taken on the line 5—5 of Fig. 4.
Figure 6:
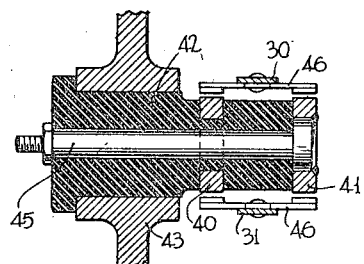
Fig. 6 is a fragmentary sectional view on an enlarged scale taken on the line 6—6 of Fig. 1.
Figure 7:
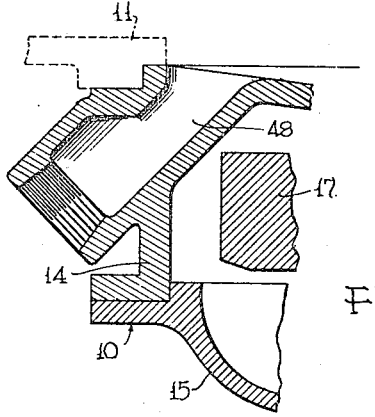
Fig. 7 is a fragmentary sectional view taken on the line 7—7 of Fig. 2.

In the preferred form of inertia governor device of Figs. 1 to 7, inclusive, the inertia governor device together with the electric switch controlled thereby is housed in a unitary casing 10 which may take the place of the usual cover on the end of the axle bearing box 11 and be secured directly to the margin of the opening 12 in a manner to form a tight closure therefor, by the bolts 13.

The casing, for convenience of assembly and disassembly, may comprise two sections 14 and 15 forming a tight joint with each other and secured together by bolts 16. The rotary inertia member 17 is mounted through an antifriction bearing 18 upon an outwardly projecting boss 19 extending from the inner wall 19' of the casing 10. The outer race of the bearing 18 is secured to the hub of the inertia member between a shoulder at the inner end of the hub and a split ring engaging a groove adjacent the outer end, while the inner race is secured between a shoulder on the inner end of the boss and a nut 20 screwed onto its screw-threaded outer end. The inertia member 17 is arranged to be driven from the axle 21 of the vehicle through a connection which is readily engaged when the casing 10 is assembled, by axial movement, with the axle box 11 and axle 21, and in order to enable the inertia member, at times, to overrun or lag behind the axle, the driving connection includes resilient means.

To enable the resilient drive to be arranged at the outer face of the inertia member where it is readily accessible by removing the outer section 15 of the casing, a crank shaft 22 is passed through a bore extending concentric with the axle through the inner wall 19' of the casing and the boss 19 projecting therefrom, this shaft being rotatable in bearing bushings as 23 arranged adjacent the opposite ends thereof. At its inner end the shaft has secured to it an arm 24 which is bifurcated to straddle a stud 25 secured in eccentric relation to the end of the axle. At its outer end it has secured to it, as by a pin 26, an arm 27 which is also bifurcated at its outer end and provided with axially extending driving extensions 28 and 29 one on each of the furcations and spaced apart some distance, see Fig. 2. The extensions 28 and 29 straddle a pair of spaced leaf springs 30 and 31 arranged along chords approximating the diameter and at equal distances from the opposite sides of the axis of the inertia member.

These springs are secured as by rivets at one of their adjacent ends to axial extensions 32 and 33, respectively, of a bracket 34 bolted to the outer face of the inertia member. Adjacent their opposite free ends they extend close to the adjacent faces of the driving extensions 28 and 29, respectively, and at these free ends they bear against axially extending abutments 35 and 36, respectively, projecting from a bracket 37 bolted to the outer face of the inertia member 17.

The springs are preferably placed under a certain amount of initial tension and are held against the respective abutments 35 and 36 under this initial tension. If desired, the initial tension of the springs 30 and 31 may be augmented by a coil spring 38 arranged between their free ends and adding its tension to that of the springs 30 and 31 to hold them against the abutments 35 and 36, respectively. As clearly appears in Fig. 2 the brackets 34 and 37 and springs 30 and 31 are arranged in balanced relation about the axis of the inertia member so as to maintain it in balance.

From the foregoing, it will be seen that the inertia member is constantly driven from the axle through a yielding drive, in one direction of movement through one spring, as 30, and in the other direction of movement through the other spring 31. At normal rates of acceleration and deceleration, say not exceeding 5 miles per hour per second, the tension of the springs is sufficient to maintain them against the abutments 35 and 36 and the drive is affected with very little deflection of the springs, since the engagement of the driving extensions 28 and 29 with the springs is very close to the abutments. When the acceleration or deceleration of the axle rises above the normal, say to 10 miles per hour per second, the initial tension of the spring then doing the driving and, if the additional coil spring 38 is used, the tension of this spring also, is overcome and the spring is moved against a fixed abutment 39 projecting axially from bracket 37 between the springs 30 and 31. When such movement occurs a switch in an electric circuit may be closed and held closed as long as such excessive acceleration or deceleration persists. When the acceleration or deceleration again reaches the normal rate, i. e. the rate of travel of the vehicle, the tension of the spring under compression restores the parts to the position shown in Fig. 2.

The switch controlled by the inertia member may comprise a spaced pair of collector rings 40 and 41 mounted on a plug 42 of insulating material, which plug has its outer end rigidly mounted in the hub of a spider 43 supported from the wall of the outer casing section 15. The inner reduced end of this plug extends between the springs 30 and 31 substantially in axial alignment with the axis of the inertia member and carries the collector rings axially on the opposite sides of said springs. The collector rings are connected to binding posts 44 and 45 which in turn are connected to wires in the circuit to be controlled by the switch which wires may be extended through the wall of the casing to a usual form of attachment socket indicated at 45'. Opposite the rings 40 and 41 each of the springs 30 and 31 carries a bridging contact 46 secured to the spring intermediate its ends, suitably insulated therefrom and carrying a pair of contact buttons, one at each end thereof, but normally spaced from the rings. When, due to abnormal acceleration or deceleration, one of the springs is deflected to engage the stop abutment 39, the bridging member contact buttons of said spring are brought into engagement with the collector rings to close the switch, and the switch will be held closed until the parts return to the position of Fig. 2, following a return to normal acceleration or deceleration.

To permit examination of the switch and drive at any time, a removable cover 47 is provided to close the outer reduced end of the casing 10. When the cover is removed, direct access is had to the binding posts and to the inside of the spider 43 through the openings between the spokes thereof. To permit filling of the axle box with oil to the required level to oil the bearings of the axle, a charging port 48 may be provided in the casing part 14, see Figs. 1, 2, 7, this port opening at its inner end into the bearing box 11 and at its outer end being provided with a screw thread to receive a closing plug, not shown. The bottom of the outer end of this port is preferably arranged at the level at which it is desired to hold the oil in the bearing box. By placing this port in the casing, it is unnecessary to provide a separate filler port in the axle box.

To prevent leakage of oil from the axle box into the casing 10 a suitable packing, as 49, is provided between the shaft 22 and the boss 19. Even if there should be slight leakage of oil past the packing, it would be thrown out centrifugally into an inwardly facing annular channel 50 having an inclined bottom and discharged through an opening 51 extending from the lowest portion of said channel to the periphery of the inertia member, from whence it would collect by gravity at the bottom of the casing.

To prevent undesired surges of the inertia member, a damper is preferably associated therewith. Such damper may comprise an arm 52 extending at substantially right angles from the arm 27 and preferably integral therewith, this arm 52 having at its free end a socket arranged at right angles to the flat outer face 53 of the inertia member and carrying for telescoping movement with said socket a brake shoe 54 carrying on its face engaging the face 53 a suitable friction material 55'. The shoe is pressed into braking engagement by a spring 55 housed within the telescoping parts of the arm and shoe.

The operation of the inertia controlled switch shown in Figs. 1 to 7, inclusive will now be described. While the axle is rotating, the inertia member 17 is driven through the shaft 22 and one of the axially extending driving arms 28 or 29, engaging the spring 30 or 31 adjacent thereto, one or the other of these arms and their cooperating springs doing the driving dependent upon the direction of rotation of the axle. While the wheels and axle are decelerating at a normal rate during braking, the initial tension of the springs 30 or 31 is sufficient to prevent relative rotary movement between the inertia member and the shaft 22 rotating at the speed of the axle sufficient to overcome either of the springs and close the switch by engagement of the bridging contact carried by a spring with the collector rings 40, 41. Undesired surges of the inertia member are prevented by the damping brake 52 to 55. If, however, a wheel begins to slip, the axle at once begins to decelerate very rapidly and almost immediately after the start of slipping attains a deceleration, say double the normal deceleration. The inertia member under this abnormal deceleration overcomes the spring opposite the driving spring, overrunning the axle speed, and in overcoming the resistance of the spring, moving its associated bridging contact into contact with the collector rings to close the switch. The switch will be held closed until the deceleration again drops to a rate near the normal rate, say below 10 miles per hour per second, when the spring tension will return the parts to the position in Fig. 2 with the switch open.

With the arrangement of switch members shown little wear of the switch contacts results because they are in engagement only at intervals of wheel slip. At the same time, during such intervals the contacts are engaged with the collector rings and wipe over them to maintain them clean and free from accumulation of dirt or rust. Thus they are always maintained in good condition not withstanding the fact that they engage only in case of wheel slipping.

Figure 8:
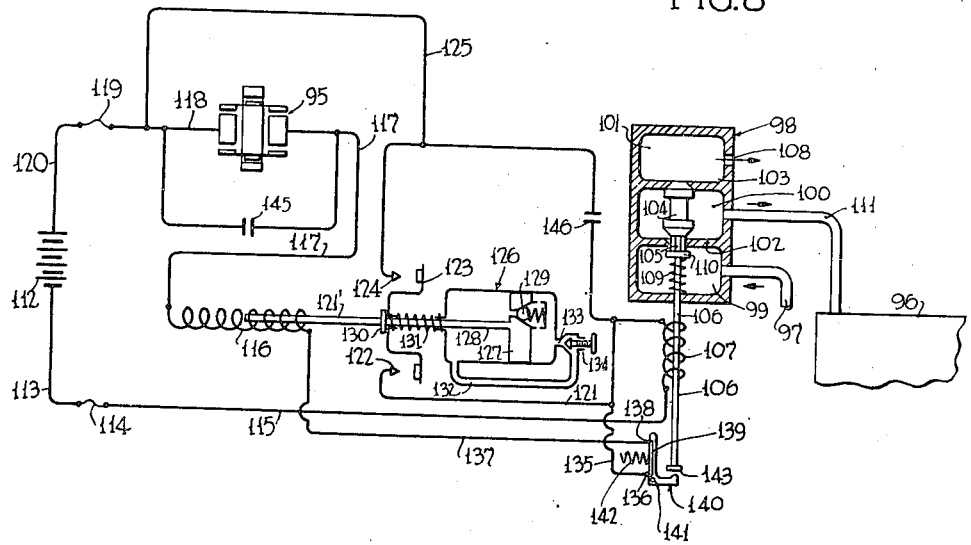
Fig. 8 is a diagrammatic view showing the electro-pneumatic system which may be controlled by the governor device of Figs. 1 to 7 or its equivalent.

In Fig. 8 is shown a diagram of an electropneumatic brake control system which may be employed in conjunction with the inertia-responsive device described or its equivalent, for controlling the brakes associated with a wheel and axle for preventing wheel slide. In this diagram, the inertia-responsive switch is designated by 95, the brake cylinder by 96, the operator-controlled pipe line for supplying fluid under pressure to the brake cylinder, by 97 and the automatically controlled valve device controlling the admission to and release of fluid from the brake cylinder by 98. The condition of this valve is controlled by the control circuit or circuits responsive to the inertia switch 95. The valve 98 may comprise three chambers 99, 100 and 101 separated by ported partitions 102, 103. A double-acting valve 104 is arranged in the chamber 100 and has a fluted stem 105 guiding it through the port in partition 102, the fluted stem being continued by a stem 106 of reduced section through an opening in the end wall of the valve casing, this outer projecting portion of the stem forming an armature operable by a magnet coil 107.

The valve is normally held in the position shown closing the port in the partition 103, which in turn leads to the exhaust port 108, and opening the port through the partition 102, by a spring 109 surrounding the valve stem and bearing at one end against a collar 110 thereon and at the other end against the adjacent end wall of the valve casing. In this position communication is established between the operator-controlled supply pipe through the pipe 111 connecting the valve chamber 100 to the brake cylinder. While the valve is in this position, the brake cylinder pressure is thus under the control of the operator and can be varied at will.

When the wheel braked by the pressure in the brake cylinder starts to slip the switch 95 is closed immediately, since the wheel starts to decelerate rapidly as soon as slipping is instigated. This closes a primary circuit from battery 112 or other source of energy, through lead 113, fuse 114, lead 115, magnet coil 107, lead 135, switch point 136, bridging contact 139, switch contact 138, lead 137, magnet coil 116, lead 117, switch contacts of switch 95, lead 118, fuse 119, and lead 120 back to the other side of the battery. The closing of this circuit immediately causes the armature 121' of a closing switch in a relay circuit to be moved to the left, Fig. 8, closing the relay circuit for energizing the magnet valve 107 to operate the valve 104 to its other or lower position, in which it cuts off the supply of fluid pressure to the brake cylinder and opens the brake cylinder to exhaust. This relay circuit comprises battery 112, lead 113, fuse 114, lead 115, magnet coil 107, lead 121, switch point 122, bridging contact 123, switch point 124, lead 125, fuse 119, and lead 120 back to the other side of the battery. Suitable condensers as 145 and 146 may be connected across the switch terminals to minimize arcing.

As soon as the valve is operated to the lower position the pressure drops rapidly in the brake cylinder releasing the brakes and allowing the wheel to accelerate back to normal. To prevent opening of the relay circuit at the time when the wheel ceases to decelerate and again starts to accelerate, at which time the inertia-responsive switch 95 in the primary circuit is open, a time delay device is associated with the relay circuit to hold the switch 122, 123, 124 closed for a predetermined time period after the opening of the primary circuit. When the wheel has started to accelerate during slipping, the inertia member at a certain point in the acceleration lags behind the wheel and closes the primary circuit again through the inertia-controlled switch 95 and holds it closed until the wheel acceleration has again come back to normal rate corresponding to the deceleration rate of the train as a whole. Not until the relay circuit is allowed to be opened by the time delay device (which is again actuated to its starting position upon the second closure of the primary circuit and held in this position while the primary circuit is held closed, and is finally allowed to open the relay circuit only after the time for which it has been set has elapsed following the opening of the primary circuit as the wheel returns to its normal rate) is the valve returned to the position shown in Fig. 8 and the pressure again allowed to build up in the brake cylinder to apply the brakes.

In the diagram the time delay device is shown as comprising a dash-pot 126, the piston 127 and rod 128 of which is connected to the armature 121'. The piston 127 is provided with a one-way valve 129 permitting the fluid in the dash-pot to pass rapidly without hindrance from left to right of the piston when the coil 116 is energized, to substantially instantly close the switch 122, 123, 124. The switch member 123 has a lost motion connection with the piston rod 128 and is normally held against a shoulder 130 on the rod by a light spring 131. This lost motion is provided to allow the piston 127 of the dash-pot to move to the right the required distance before the shoulder 130 strikes the contact member 123 and opens the switch. The piston may be returned by usual means, such as a spring, (not shown) and the rate of return of the piston 127 to the right is controlled by a by-pass 132 the orifice 133 of which can be adjusted by an adjustable tapered plug 134.

While a specific dash-pot delay device has been described, it will be understood that other known types of delay action devices could be used. By setting the dash-pot device to delay the opening of the relay circuit for a period greater than the period during which the primary circuit is open when the wheel goes from deceleration to acceleration during slipping, which has been found to be a very short period, of the order of a fourth of a second, ample time is assured, before the full reapplication of the brakes, to allow the wheel to return to normal speed, and yet the time can be so controlled that substantially no braking efficiency is lost except that lost during the short time in which the wheel, while slipping, is decelerating and again accelerating back to normal, which has been found of the order of one second or even less. If, after reapplication of the brakes following wheel slipping, the track conditions should be such as to reduce rail adhesion, the wheel may again reach a slipping condition and in such event, the cycle to bring it back to normal before it actually slides on the track would be repeated. Of course, the operator could prevent such recurrence if he observed the track conditions and reduced the pressure in the control pipe 97.

Immediately upon the closing of the inertia switch when a wheel begins to slip both magnet coils 116 and 107 are energized, the one to promptly close the secondary or relay circuit and the other to operate the valve 104 to cut off and release position. The stem 106 of the valve opens the primary circuit at switch contacts 136, 138 immediately after closing of the secondary circuit, so that in this instance the time delay device will have to be adjusted for a period greater than the combined time of the deceleration period during which the inertia switch is closed due to deceleration of the wheel incident to slip and the period said switch is open while the wheel is passing from deceleration to abnormal acceleration such as will again close the inertia switch by relative reverse movement of the axle and inertia member. Thus the secondary circuit will be opened a predetermined time after the wheel comes back to speed to permit the reapplication of the brakes. In the form shown in Fig. 8 the time at which the brakes are again reapplied assuming the operator keeps his brake applying valve in the same position during wheel slip, is a short time, say of the order of a fourth of a second after the return of the wheel to the speed of the train.

Figure 9:
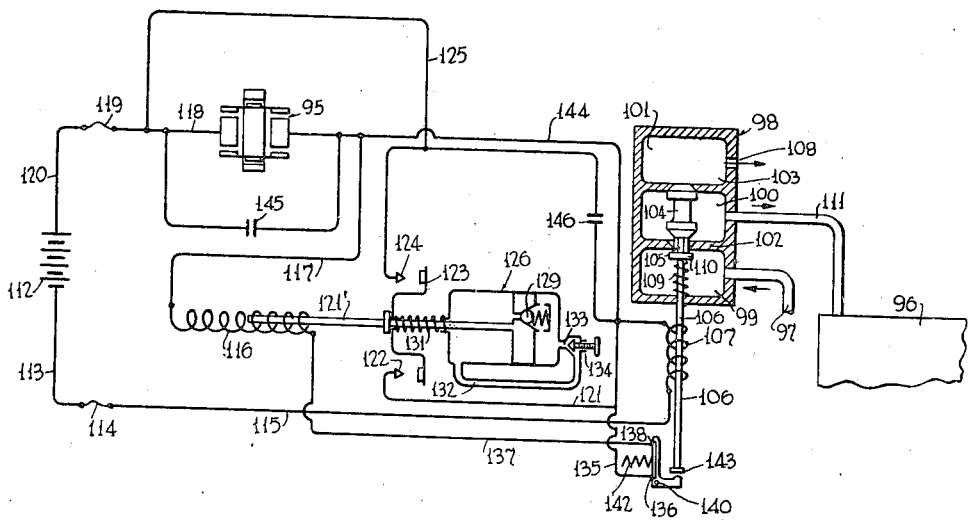
Fig. 9 is a similar diagrammatic view of a modified system which may be controlled by the governor device of Figs. 1 to 7 or its equivalent.

In Fig. 9 is shown another modification of the control circuits which will now be described, similar parts being designated by like reference numerals.

The form of the device shown in Fig. 9 is calculated to make it possible to reapply the brakes immediately after the wheel has returned to speed and is thus perhaps more efficient in not losing any braking time except such as is necessitated to prevent wheel slide. The circuits are the same as in Fig. 8 except that a lead 144 is arranged in parallel with the part of the primary circuit including the magnet coils 116 and 107. Thus another circuit is completed through the inertia switch comprising battery 112, lead 113, fuse 114, lead 115, coil 107, lead 144, inertia switch 95, lead 118, fuse 119 and lead 120 back to the other side of the battery.

The operation of this modification is as follows:

Immediately upon closing of the inertia-switch when a wheel begins to slip both magnets in the one branch of the primary circuit are energized as before to close the secondary or time-controlled circuit and to move the valve to cut off and release position. This latter movement again results in the prompt opening of the one branch of the primary circuit including the coil 116, but the other branch of the primary circuit including the lead 144 and coil 107 is maintained closed until the wheel has substantially ceased decelerating. During this period the valve 104 is held in release position by the combined action of the one branch of the primary and the secondary circuits. When the primary circuit is opened at the inertia switch 95 as the wheel ceases to decelerate and held open until the wheel is again accelerating back to normal, the secondary circuit by reason of its time-delayed opening, is holding the valve open. As soon as the acceleration is sufficient to again close the inertia switch, the first branch of the primary circuit, being held open at the switch 136, 138, 139, since the valve is held open at this time by the secondary circuit, is ineffective but the second branch including lead 144 is effective to maintain the valve open until the wheel has accelerated back to normal, when the inertia switch is opened, even if the secondary circuit has been opened before the wheel has accelerated back to normal. Thus, according to the modification, the brakes are again applied immediately upon the return of the wheel to speed after slipping, and a minimum of braking time is lost due to wheel slippage.

What is claimed is:

1. In a brake control for vehicle wheels, a brake cylinder for applying the brakes of a wheel, an operator-controlled pipe connected to said brake cylinder to supply or release fluid under pressure to or from said cylinder to apply or release the brakes, a valve device for cutting off the operator-controlled fluid pressure and for releasing fluid pressure from the cylinder to release the brakes, said valve device being normally biased to inoperative position, a magnet for operating said valve device, when energized, to move it to operative position cutting off the operator's control and releasing the fluid pressure from the cylinder, a relay circuit, when closed, energizing said magnet, another circuit, means for closing said relay circuit upon the closing of said other circuit, a rotary inertia device normally rotatable with the wheel and operative upon excessive deceleration or acceleration of the wheel, such as occurs upon wheel slip, to close said other circuit, means for opening said other circuit immediately after the relay circuit is closed, and means associated with the relay circuit closing means for delaying its opening after closure for a predetermined time, said delay means being conditioned by the closing of said other circuit during slipping of the wheel to extend the time of opening of the relay circuit and the return of the brake control to the operator until the wheel has fully returned to vehicle speed.

2. In a brake control for vehicle wheels, a brake cylinder for applying the brakes of a wheel, an operator-controlled pipe connected to said brake cylinder to supply or release fluid pressure to or from said cylinder to apply or release the brakes, a valve device for cutting off the operator-controlled fluid pressure and for releasing fluid pressure from said cylinder to release the brakes, said valve device being normally biased to inoperative position, a magnet for operating said valve device, when energized, to operative position cutting off the operator's control and releasing fluid pressure from the cylinder, a relay circuit, when closed, energizing said magnet, another circuit, means for closing said relay circuit upon the closing of said other circuit, a rotary inertia device normally rotatable with the wheel and operative upon excessive deceleration or acceleration of the wheel, such as occurs upon wheel slip, to operate a switch to close said other circuit, means for opening said other circuit immediately after the closing of the relay circuit and maintaining it open while the valve is held in its operative position, means associated with the relay circuit closing means for delaying its opening at least until the wheel is accelerating back toward vehicle speed, and a third circuit including said magnet and the inertia-controlled switch for energizing said magnet continuously from the opening of said relay circuit and until the wheel has accelerated back substantially to vehicle speed.

3. In a brake control for vehicle wheels, a brake cylinder for applying brakes to a wheel or wheels of a vehicle, operator-controlled means for supplying or releasing fluid pressure to or from said cylinder to apply or release the brakes, means for cutting out the operator-controlled means and for dumping fluid pressure from the cylinder to ease off the brakes, said cut-out and dumping means being normally biased to inoperative position, a solenoid for moving said last-named means to operative position, a relay circuit, when closed, energizing said solenoid, another circuit, means for closing said relay circuit upon the closing of said other circuit, a wheel-slip-controlled switch associated with said wheel or wheels and operative upon excessive deceleration or acceleration of an associated wheel, such as occurs on wheel slip, to close said other circuit, means other than said switch for opening said other circuit immediately after said relay circuit is closed, and means associated with said relay circuit closing means for delaying its opening after closure for a predetermined time, said delay means being conditioned by the closing of said other circuit upon deceleration of an associated wheel during slipping thereof to extend the time of opening of the relay circuit and the return of the brake control to the operator until the wheel has substantially fully returned to vehicle speed.

4. In a brake control for vehicle wheels, a brake cylinder for applying brakes to a wheel or wheels of the vehicle, operator-controlled means comprising fluid pressure means for supplying or releasing fluid pressure to or from said cylinder to apply or release the brakes, a valve for dumping pressure from said cylinder, a solenoid for actuating said valve to dump said pressure, and means operative upon wheel slip for energizing said solenoid comprising a wheel-controlled circuit adapted to be closed upon excessive acceleration or deceleration of an associated wheel, such as is incident to wheel slip, a relay circuit, when closed, energizing said solenoid, said relay circuit being adapted to be closed by the closing of said wheel-controlled circuit, means for opening said wheel-controlled circuit immediately after the closing of said relay circuit, and means associated with said relay circuit for delaying its opening after closure for a predetermined time sufficient to allow the slipped wheel to return substantially to the speed of the vehicle.

CAROLUS L. EKSERGIAN.